United States Patent [19]

Donnelli et al.

[11] 4,201,255

[45] May 6, 1980

[54] MACHINE FOR THREADING FASTENERS INTO WORKPIECES

[75] Inventors: Joseph W. Donnelli; Richard D. Barnes, both of Rockford, Ill.

[73] Assignee: Southern Imperial, Inc., Tupelo, Mich.

[21] Appl. No.: 958,036

[22] Filed: Nov. 6, 1978

[51] Int. Cl.² .............................................. B25B 23/10
[52] U.S. Cl. .................................. 144/32 R; 29/810; 221/212; 221/251
[58] Field of Search ................... 29/810; 221/212, 251, 221/293; 144/32; 81/53.2

[56] References Cited

U.S. PATENT DOCUMENTS 3,902,537  9/1975  Donnelli ................................ 144/32

*Primary Examiner*—Travis S. McGehee
*Assistant Examiner*—W. D. Bray
*Attorney, Agent, or Firm*—Leydig, Voit, Osann, Mayer & Holt, Ltd.

[57] ABSTRACT

Hanger bolts are delivered one-by-one from a hopper and each is picked up by a reciprocating holder which shifts the bolt laterally and broadwise into alinement with a power-rotated chuck. The bolt then is pushed endwise into the chuck by a furniture leg and is threaded into the leg as an incident to being turned about its own axis by the chuck. A shelf, a gate and an escapement coact to effect delivery of the bolts from the hopper to the holder in timed relation with the reciprocation of the holder.

17 Claims, 8 Drawing Figures

MACHINE FOR THREADING FASTENERS INTO WORKPIECES

BACKGROUND OF THE INVENTION

This invention relates to a machine for screwing elongated threaded fasteners into workpieces. The invention more particularly relates to a machine for driving a fastener into a workpiece of the type which does not lend itself to automatic handling and which usually is held in the hand of or manipulated by an operator during the driving operation.

A machine of this general type is disclosed in Donnelli U.S. Pat. No. 3,902,537. In that machine, fasteners which are initially stored in a hopper are delivered down a downwardly inclined track and are fed toward a rotatable head having a series of power-rotated chucks. Each chuck first is indexed to a loading station to receive a fastener and then is indexed to a driving station where the fastener may be threaded into a workpiece.

SUMMARY OF THE INVENTION

The general aim of the present invention is to provide a new and improved fastener driving machine which is automated to the extent that the operator need never handle the fasteners but which, at the same time, may be manufactured at a significantly lower cost than prior driving machines used for the same general purpose.

A more detailed object is to achieve the foregoing by providing a machine in which a single power-rotated chuck is spaced laterally from the track and in which unique mechanism automatically delivers the fasteners laterally from the lower end of the track to a position adjacent the chuck so that each fastener can be inserted into the chuck and threaded into a workpiece.

The invention also resides in a novel magnetic holder for delivering the fasteners laterally toward the chuck, in unique mechanism for delivering fasteners one at a time from the track to the holder in timed relation with the movement of the holder, and in the novel manner in which each fastener is inserted into the chuck while being supported by the holder.

These and other objects and advantages of the invention will become more apparent from the following detailed description when taken in conjunction with the accompanying drawings.

DETAILED DESCRIPTION OF THE PREFERRED EMBODIMENT

Figure 2:
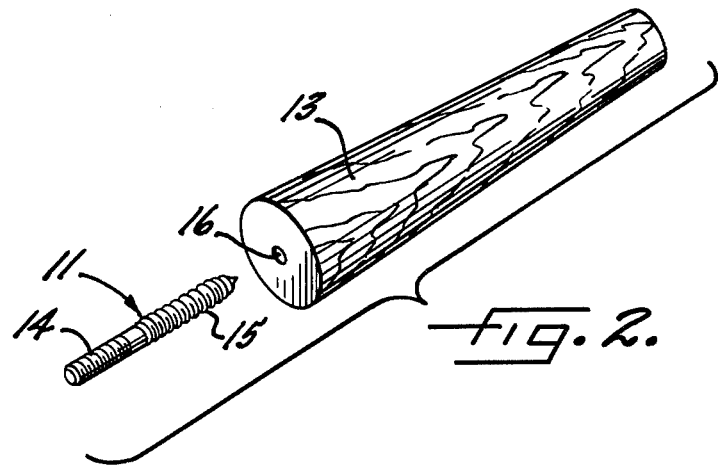
FIG. 2 is an exploded perspective view showing an exemplary fastener and workpiece.

As shown in the drawings for purposes of illustration, the invention is embodied in a machine 10 for screwing threaded fasteners 11 into workpieces 13. Herein, each fastener comprises a so-called hanger bolt having a nut end 14 (FIG. 2) with a machine thread and a screw end 15 with a wood-type thread. The screw end 15 of the bolt 11 is adapted to be threaded into a predrilled hole 16 in the workpiece 13 which, in this instance, is in the form of a wood leg for a piece of furniture.

The machine 10 comprises a main support or frame 17 upon which is mounted a stationary supply hopper 18 having a grooved end plate 19 adapted to be rotated about an upwardly and forwardly inclined axis by an electric motor 20. Bolts 11 gravitate downwardly and rearwardly in the hopper toward the end plate and are carried around to the upper portion thereof. Thereafter, the bolts slide one-by-one down a downwardly and forwardly inclined channel-like track 23 leading from the hopper, the bolts being properly oriented on the end plate so as to proceed down the track with their screw ends 15 disposed in leading relationship (see FIG. 3).

In order to drive the bolts 11 into the furniture legs 13, the machine 10 includes a chuck 24 which is adapted to be power-rotated by the forwardly extending shaft 25 of an electric motor 26 which is suitably supported on the frame 17 for selective adjustment both in a vertical direction and in a fore-and-aft direction. The chuck may be of conventional construction such as disclosed, for example, in U.S. Pat. Nos. 2,492,307 and 2,531,456 and need not here be described in detail. It will suffice to say that the chuck includes a continuously rotating sleeve 27 (FIG. 5) having a pair of jaws 28 which are initially stationary and open to receive the bolt 11. As the bolt moves rearwardly between the jaws and engages a plunger 30 (see FIG. 6), the latter is pushed rearwardly to cause the jaws to close and grip the bolt. With continued rearward movement of the bolt into the sleeve 27, the jaws are coupled to and rotate in unison with the sleeve so as to rotate the bolt about its own axis.

In accordance with the present invention, each bolt 11 delivered endwise from the track 23 is picked up by a unique holder 35 and is shifted laterally and broadwise to a position in which the bolt is alined laterally with the chuck 24. The bolt then may be engaged by the furniture leg 13 and pushed rearwardly into the chuck and, when the bolt is gripped and rotated by the chuck, it is screwed into the hole 16 in the leg. This arrangement enables virtually automatic handling of the bolts and yet results in a machine 10 which is comparatively simple and inexpensive.

Figure 5:
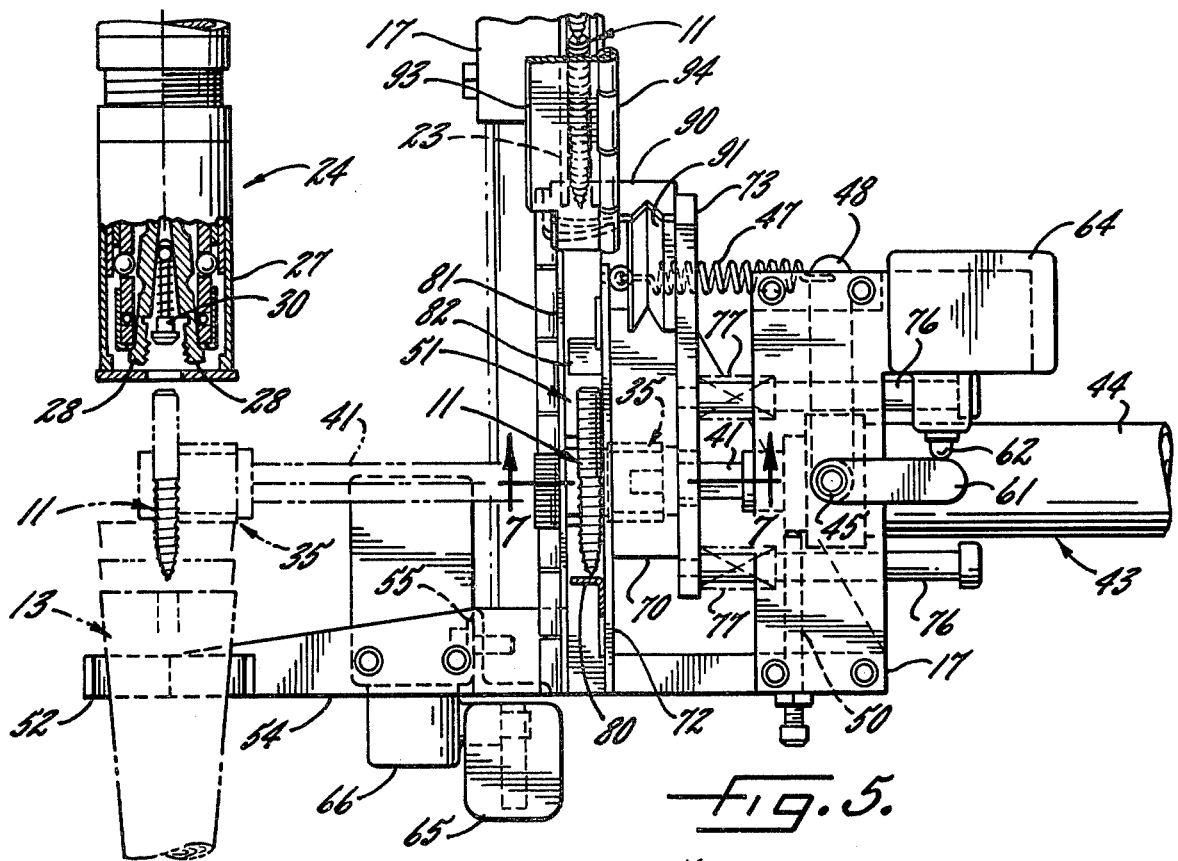
FIG. 5 is an enlarged fragmentary plan view of the machine shown in FIG. 1, parts of the machine being broken away and illustrated in section.
Figure 6:
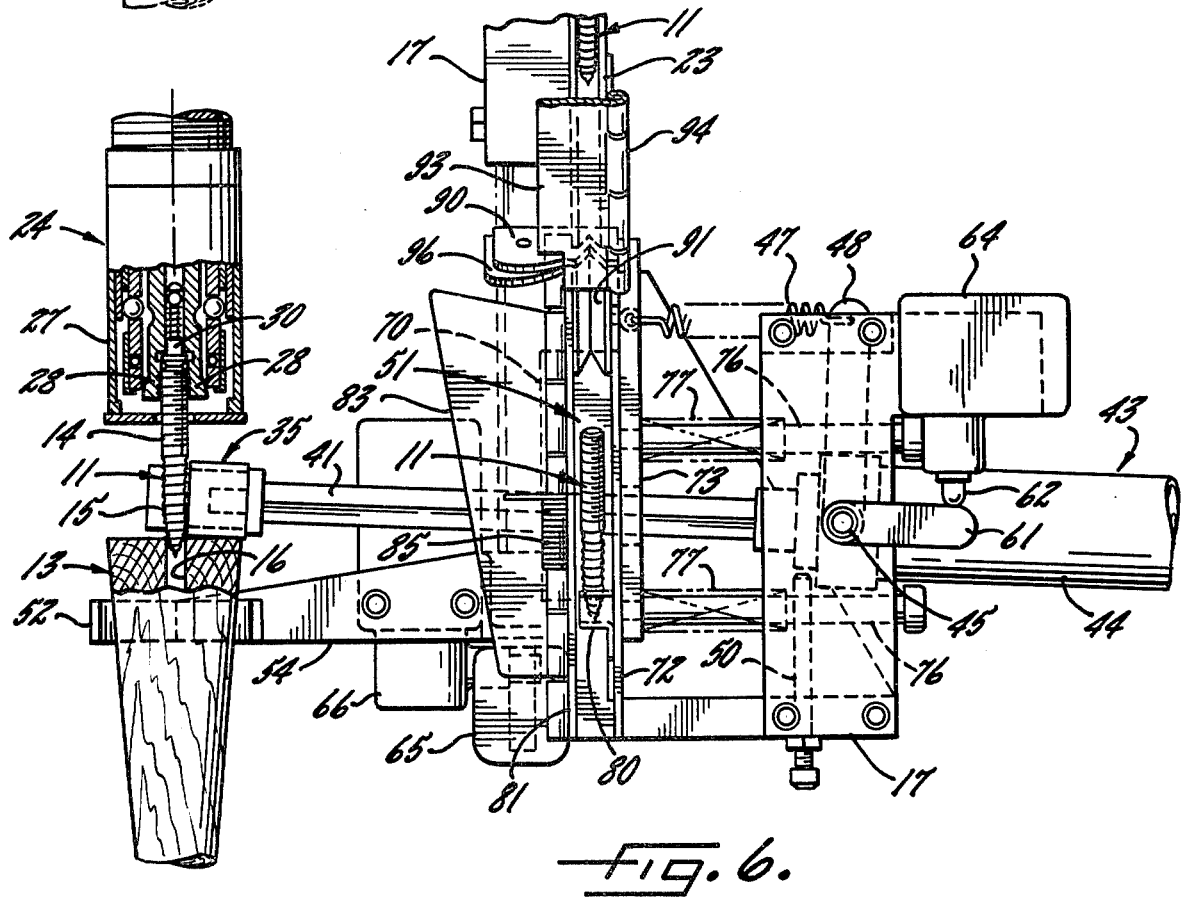
FIG. 6 is a view similar to FIG. 5 but shows certain parts of the machine in moved positions.

More specifically, the holder 35 comprises a cylindrical permanent magnet 36 (FIG. 8) having an outboard face 37 which is adapted to attract and engage one side of each bolt 11 delivered from the track 23. The magnet is encircled by a non-magnetic ring 38 having a tongue 40 formed integrally with and projecting outwardly from its lower side. The upper side of the tongue coacts with the outboard face 37 of the magnet to form an L-shaped cradle for supporting the bolt 11. As shown in FIGS. 5 and 6, the fore-and-aft dimension of the holder 35 is substantially less than the length of the bolt 11 and thus the ends of the bolt overhang the holder.

The holder 35 is carried by a hexagonal rod 41 (FIG. 8) whose outer end is threaded into the magnet 36 as indicated at 42. Herein, the rod 41 forms part of a pneumatic actuator 43 (FIGS. 5 and 6) having a laterally extending cylinder 44 which slidably receives the rod. The cylinder is mounted to pivot on the frame 17 in a fore-and-aft direction and about a vertical axis by upper and lower upright trunnions 45 and 46 (FIG. 5) connected rigidly to the cylinder and pivotally mounted by the frame 17. A contractile spring 47 (FIG. 5) is stretched between the frame and an arm 48 on the lower trunnion 46 and urges the cylinder 44 in a direction to swing the holder 35 forwardly or counterclockwise as viewed in FIGS. 5 and 6. Forward swinging of the holder is limited by a stop screw 50 threaded into the frame 17 and adapted to engage the forward end portion of the cylinder.

Each bolt 11 delivered from the track 23 drops onto and is magnetically retained by the holder 35 when the rod 41 is retracted and the holder is positioned in a loading station 51 as shown in full lines in FIG. 5, the loading station being located adjacent the lower end of the track. When the cylinder 44 is pressurized to extend the rod, the holder moves the bolt broadwise and laterally to a position in which the bolt is alined laterally with and is spaced forwardly from the chuck 24 (see the dotted line position of the holder in FIG. 5). The bolt is then in position to be pushed into the chuck by the furniture leg 13.

Figure 1:
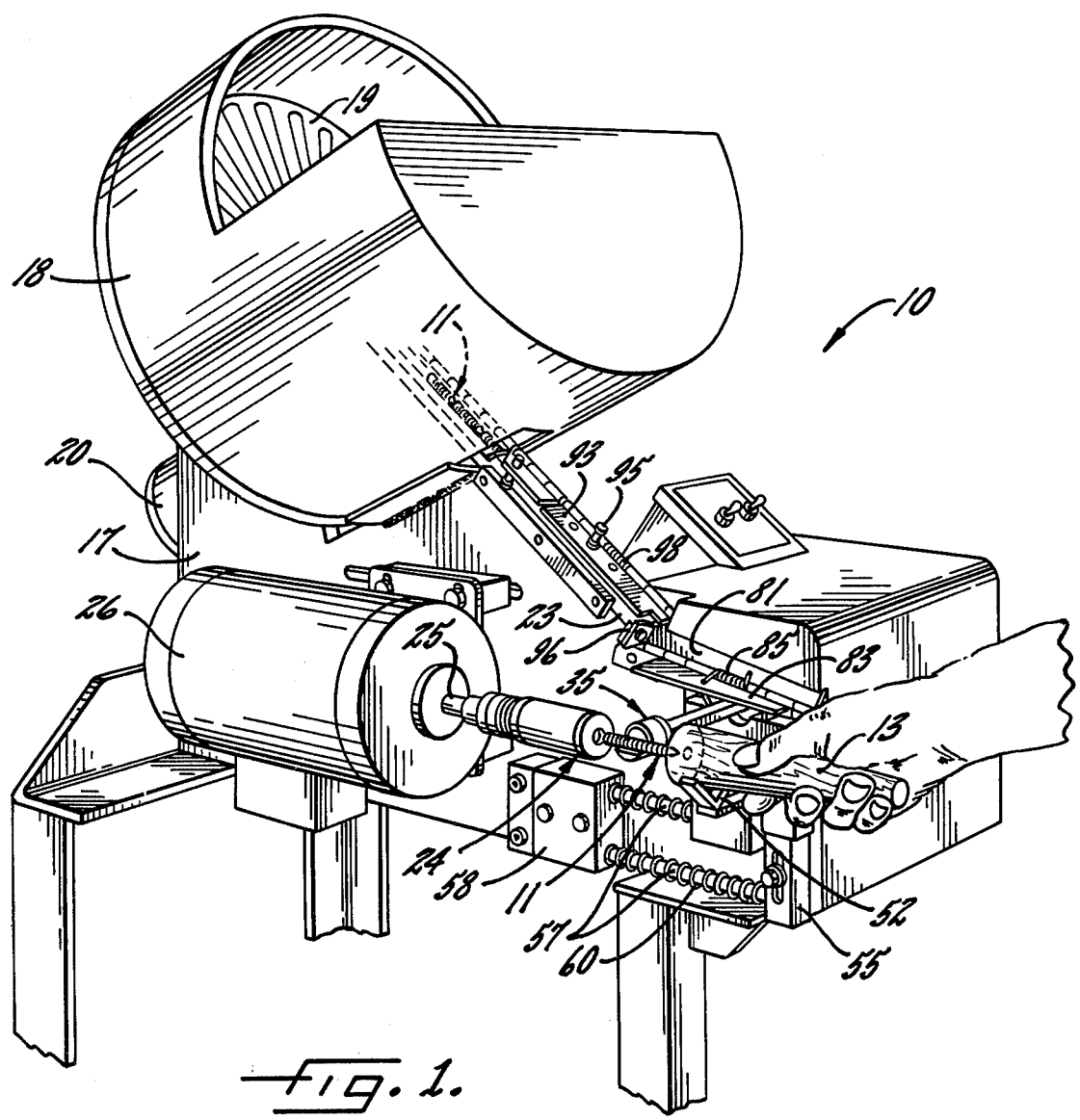
FIG. 1 is a perspective view of a new and improved fastener driving machine incorporating the novel features of the present invention.
Figures 3, 4:
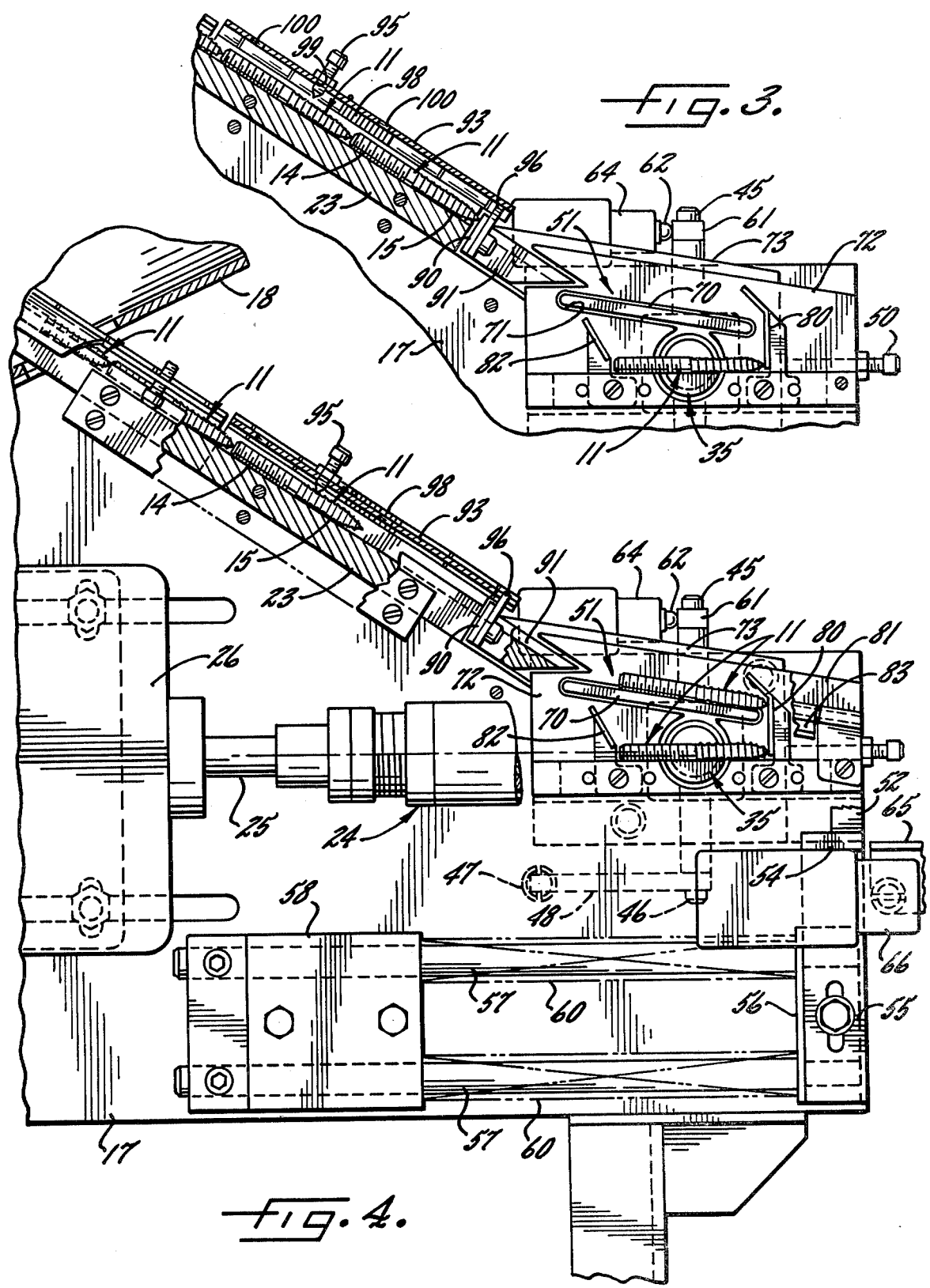
FIG. 3 is an enlarged fragmentary elevational view of the machine shown in FIG. 1, parts of the machine being broken away and illustrated in section.
FIG. 4 is a view similar to FIG. 3 but shows certain parts of the machine in moved positions.

To enable controlled pushing of the bolt 11 by the furniture leg 13, the latter is adapted to be supported in a generally V-shaped cradle 52 (FIGS. 1, 5 and 6) spaced forwardly from the chuck 24 and disposed in lateral alinement therewith. The cradle is carried on the outer end of a laterally extending arm 54 whose inner end is connected to an upright arm 55 (FIG. 4). The latter is mounted for selective vertical adjustment on a block 56 which is connected to the forward ends of a vertically spaced pair of forwardly extending horizontal rods 57. At their rear end portions, the rods 57 are telescoped slidably into a guide block 58 secured to the frame 17. Coil springs 60 are telescoped over the rods and are compressed between the blocks 56 and 58 to urge the forward block 56 and the cradle 52 in a forward direction.

When the rod 41 is in its extended position, the bolt 11 on the holder 35 is located between the chuck 24 and the cradle 52 as shown in dotted lines in FIG. 5 and is located such that its nut end 14 is pointing toward the chuck. With the bolt so positioned, the operator of the machine may place a furniture leg 13 in the cradle with the hole 16 in the leg facing the screw end 15 of the bolt. The operator then may push the leg 13 rearwardly to pilot the hole 16 and the screw end 15 of the bolt into shallow telescoping relation. In moving the leg rearwardly, the operator grasps the leg in one hand and, with the same hand, pushes against the cradle 52 and the horizontal arm 54. In this way, the leg 13 and the cradle 52 move rearwardly in unison so that the cradle maintains firm control of the leg and keeps the hole 16 alined with the bolt 11.

Upon initially being pushed rearwardly, the leg 13 engages the bolt 11 and slides the latter rearwardly along the holder 35. With continued rearward movement of the leg, the bolt moves into the chuck 24 and, at about the same time, the end of the leg engages the holder 35 and swings the holder rearwardly or clockwise (FIG. 6) as permitted by the trunnions 45 and 46 which support the cylinder 44. At about the time the bolt 11 engages the plunger 30 and causes the jaws 28 to close and grip the bolt, the holder 35 and the cylinder 44 move to the position shown in FIG. 6 and, with the cylinder so positioned, an arm 61 on the upper trunnion 45 releases the actuator 62 of a microswitch 64 mounted on the frame 17. When its actuator is momentarily released, the switch causes the cylinder to be pressurized in a direction to retract the rod 41 and the holder 35 toward the position shown in FIG. 5. Once the holder has cleared the leg 13, the spring 47 swings the cylinder in a counterclockwise direction to return the rod 41 back to its original laterally extending position.

With the bolt 11 being gripped and rotated by the chuck 24, the operator may continue to push the leg 13 forward to cause the screw end 15 of the bolt to thread into the hole 16 in the leg. Rotation of the jaws 28 is stopped automatically when the bolt is driven to depth in the leg 13 and, when the operator pulls the leg forwardly, the jaws release the bolt. When rearward hand pressure on the cradle 52 is released, the springs 60 return the cradle forwardly into position to receive the next leg. The operator may cause the rod 41 to extend and move the holder 35 to its ready position with the next bolt 11 by momentarily depressing a pivoted paddle 65 (FIG. 5) to actuate a switch 66 and cause pressurization of the head end of the cylinder 44. The paddle 65 and the switch 66 are carried on the lower side of the arm 54.

From the foregoing, it will be apparent that bolts 11 from the track 23 are picked up one-by-one by the holder 35 and each is delivered broadwise to a position where the bolt may be pushed endwise into the chuck 24 by the leg 13 for driving into the leg. The transferring and driving of the bolts can be carried out quickly and easily with the operator needing only to manipulate the legs and not being required to touch the bolts. While the machine 10 lends itself to quick and easy operation, it is of relatively simple and low cost construction since the machine requires only a single chuck 24. Also, the machine may be easily changed over to accommodate legs 13 of various diameters and bolts 11 of various lengths and diameters. The cradle 52 may be adjusted vertically relative to the block 56 to adapt the cradle to handle legs of different diameters while the motor 26 may be adjusted vertically on the frame 17 to center the chuck 24 relative to bolts of different diameters and may be adjusted forwardly or rearwardly to enable the chuck to accommodate bolts of different lengths.

Those familiar with the art will appreciate that the leg 13 could be held in a stationary position in front of the chuck 24 and that the chuck could be moved forwardly to first grip and rotate the bolt 11 and then to drive the bolt into the leg. While such an arrangement enables the machine 10 to be more completely automated, it increases the cost of the machine somewhat since it is necessary to make provision for moving the chuck back and forth on the frame 17.

In other of its aspects, the invention contemplates the provision of novel mechanism which effects rapid transfer of the bolts 11 from the track 23 to the holder 35 in timed relation with the back and forth lateral movement of the holder. Herein, this mechanism includes a shelf 70 (FIGS. 3, 4, 7 and 8) which is positioned in the loading station 51 to catch each bolt delivered from the track and to drop the bolt onto the holder 35 when the latter is moved back into the loading station. The shelf 70 is in the form of a generally horizontal plate which is adapted to extend through a slot 71 (FIG. 3) formed in a stationary upright wall 72 that defines one side of the loading station. Joined to one edge of the shelf is a vertically extending plate 73 which lies along one side of the wall 72 and which is formed with a hole 74 (FIG. 7) for accommodating the rod 41. The wall 72 also is formed with a hole 75 for the rod and both holes are sufficiently large to accommodate the rod when the latter swings about the trunnions 45 and 46.

In keeping with the invention, the shelf 70 is moved to an active position (FIGS. 4, 6 and 8) to catch a bolt 11 from the track 23 when the holder 35 first is moved laterally out of the loading station 51 to carry a preceding bolt to the chuck 24. When the empty holder returns to the loading station, the shelf is pulled to an inactive position (FIGS. 3, 5 and 7) and drops the bolt onto the holder. For this purpose, the lower end portion of the plate 73 is connected to two horizontally spaced and laterally extending rods 76 (FIG. 5) which are guided for lateral sliding by the frame 17. Springs 77 are telescoped over the rods and are compressed between the plate 73 and the frame to urge the plate toward the wall 72 and thus urge the shelf 70 toward its active position.

Figure 7:
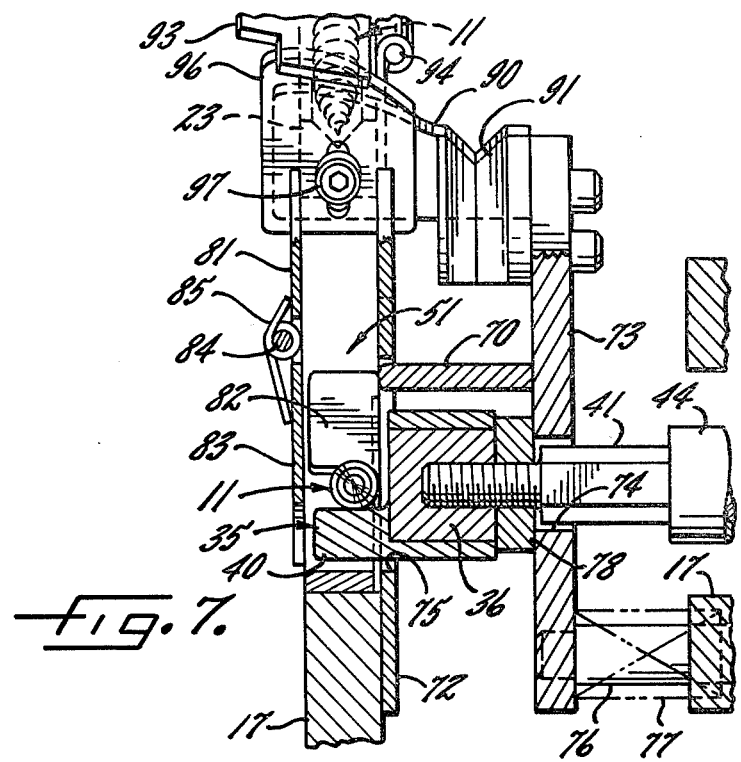
FIG. 7 is an enlarged fragmentary cross-section taken substantially along the line 7—7 of FIG. 5.

When the holder 35 is positioned in the loading station 51 as shown in FIG. 7, a collar 78 located on the rod 41 and just behind the holder engages the plate 73 and holds the shelf 70 in a retracted or inactive position. As the holder shifts out of the loading station, the collar 78 moves away from the plate 73 to allow the springs 77 to move the shelf 70 through the slot 71 to its active position. When in its active position, the shelf overlies the spaced previously occupied by the holder 35 and is alined with the lower end of the track 23. Thus, the holder is in position to catch a bolt 11 discharged from the lower end of the track. That bolt is prevented from sliding off of the forward end of the shelf by a vertically extending wing 80 (FIG. 3) which is secured to the frame 17. The wall 72 captivates the bolt against broadwise movement on the shelf in one direction while a laterally spaced stationary wall 81 (FIG. 7) prevents the bolt from falling broadwise off of the shelf in the other direction.

When the holder 35 returns to the loading station 51, the collar 78 engages the plate 73 and pulls the shelf 70 to its inactive retracted position (FIG. 7). Accordingly, the shelf is pulled from beneath the bolt 13 which rests on the shelf and thus that bolt drops onto the holder and is captivated by the magnet 36 (see FIG. 7). The wing 80 coacts with a second upstanding wing 82 (FIG. 3) to locate the bolt in a proper fore-and-aft position on the holder 35. The two wings may be independently adjusted on the frame 17 to accommodate bolts of different lengths.

Advantageously, means are provided for preventing the bolt 13 from rolling broadwise off of the holder 35 when the bolt is first dropped on the holder by the shelf 70. In this instance, these means comprise a door 83 (FIG. 7) which is pivoted on the lower edge of the wall 81 by a forwardly extending horizontal pin 84. A torsion spring 85 encircles the pin and bears against the wall 81 and the door 83 to urge the latter to a vertically extending closed position. Thus, the door closes the lower end of one side of the loading station 51 and prevents the bolt 11 from rolling off of the holder 35 when the bolt is first dropped by the shelf 70 and before the bolt is captivated by the magnet 36.

When the holder 35 is advanced out of the loading station 51, the tongue 40 engages the door 83 and pivots the latter upwardly to an open position (FIG. 8) so that the rod 41 may move to its fully extended position. As the shelf 70 moves to its active position, it engages the door and holds the door in its open position. When the holder 35 returns to the loading station 51 and the shelf 70 is retracted, the torsion spring 85 swings the door 83 downwardly to its closed position. Thus, the door serves to prevent the bolt 13 dropped from the shelf 70 from rolling off of the holder 35 but opens automatically to enable the holder to advance out of the loading station 51.

Because the tongue 40 of the holder 35 is non-magnetic, the bolt 11 dropped from the shelf 70 will, in most instances, be attracted to and positioned against the upright face 37 of the magnet 36 and thus will be located in the proper lateral position to move into alinement with the chuck 24. In the event that the bolt 11 is not attracted into engagement with the face 37 of the magnet when the bolt is first dropped from the shelf 70, the bolt will brush against the lower edge portion of the door 83 and will be rolled against the face 37 of the magnet when the holder 35 is first advanced from the loading station 51.

Figure 8:
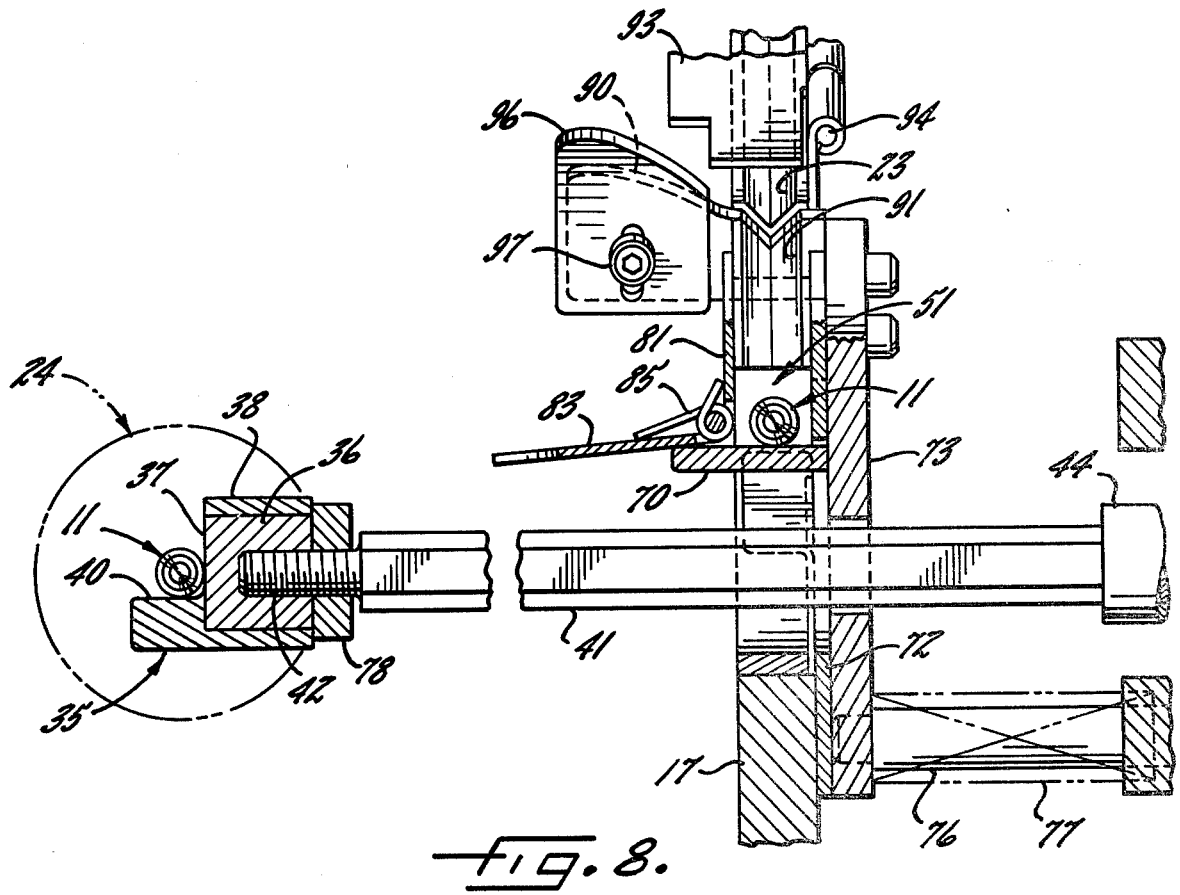
FIG. 8 is a view similar to FIG. 7 but shows certain parts of the machine in moved positions.

Means are provided for insuring that only one bolt 11 is delivered from the track 23 to the shelf 70 during any one cycle of the machine 10. Herein, these means comprise a gate 90 adapted to shuttle between a closed position (FIGS. 3, 5 and 7) blocking the lower end of the track 23 and an open position (FIGS. 4, 6 and 8) permitting the lowermost bolt 13 in the track to move downwardly onto the shelf 70. As shown in FIGS. 6 and 8, the gate 90 is simply a flat plate which is adapted to move laterally back and forth across the end of the track 23. The gate is carried on a V-shaped track section 91 which is similar to the track 23 and which, in turn, is secured to the plate 73 that supports the shelf 70.

When the shelf 70 is moved from its inactive position (FIG. 7) to its active position (FIG. 8), the gate 90 moves from its closed position blocking the track 23 to an open position releasing the lowermost bolt 11 from the track. At the same time, the track section 91 moves into alinement with the track 23 and serves to guide the lowermost bolt 11 as the latter moves from the track and onto the shelf 70. Thus, the bolt does not free fall onto the shelf but instead is maintained under control by the track section 91.

As the shelf 70 is retracted to its inactive position (FIG. 7), the gate 90 is shifted to its closed position across the lower end of the track 23 to prevent a bolt 11 from dropping out of the track while the shelf is retracted. When the gate is in its closed position, the track section 91 is spaced laterally from the track 23 as shown in FIG. 7.

Provision is made of an escapement 93 to prevent more than one bolt 11 from being discharged from the track 23 when the gate 90 is in its open position. In this instance, the escapement 93 comprises a plate which overlies the lower end portion of the track and which is pivoted on the track at 94 to swing upwardly and downwardly between active (FIGS. 4, 6 and 8) and inactive (FIGS. 3, 5 and 7) positions. A member in the form of a screw 95 (FIGS. 3 and 4) depends from the plate 93 and is adapted to engage and retain a bolt 11 in the track 23 when the plate is in its active position and to release the bolt when the plate is pivoted upwardly to its inactive position. Upward movement of the plate 93 to its inactive position is effected by a cam 96 (FIGS. 7 and 8) which is adjustably secured at 97 to the forward side of the gate 90 and which is adapted to engage the lower side of the plate 93. A torsion spring 98 (FIG. 3) is associated with the pivot 94 of the plate 93 and urges the latter downwardly to its active position.

When the gate 90 is shifted to its open position (FIG. 8) to enable the lowermost bolt 11 in the track 23 to drop onto the shelf 70, the cam 96 moves from beneath the plate 93 and thus the plate pivots downwardly to its active position under the urging of the spring 98. In this position of the plate, the screw 95 engages the screw end 15 of the next bolt 11 proceeding down the track (see FIG. 4) and prevents such bolt from moving to the gate 90 while the latter is open to release the preceding bolt.

As the gate 90 is shifted to its closed position (FIG. 7), the cam 96 engages the underside of the plate 93 and swings the plate upwardly to its inactive position (see FIG. 3). As a result, the bolt 11 which was held by the screw 95 is released and slides down the track 23 and into engagement with the gate for delivery to the shelf 70 when the gate is next opened. Thus, the gate 90 and the plate 93 coact to insure that only one bolt 11 at a time is discharged from the track 23 and that that bolt is discharged only when the shelf 70 is in its active position to catch the bolt.

As shown in FIG. 3, the screw 95 is threaded into and extends through a hole 99 in the plate 93. By placing the screw 95 in a selected one of a plurality of other holes 100 in the plate, the screw may be located so as to properly retain a bolt 11 of different length. Also, bolts of different diameters can be accommodated by changing the vertical position of the cam 96 at its connection 97 to the gate 90.

We claim:

1. A machine for driving elongated threaded fasteners into workpieces, said machine comprising a support, means on said support for storing a supply of fasteners and for delivering the fasteners one at a time to a loading station, a power-rotated chuck mounted on said support and adapted to grip a fastener and to rotate the fastener about its own axis, the improvement in said machine comprising, a holder mounted on said support to move laterally between a first position in which the holder is located in said loading station and a second position in which the holder is alined laterally with said chuck, means for moving said holder between said first and second positions, said holder receiving a fastener in said loading station when said holder is in said first position and moving the fastener laterally as the holder is moved to said second position, and means on said support adjacent the second position of said holder for supporting said chuck and a workpiece for relative movement toward one another whereby, when such movement occurs with said holder in said second position, the fastener on the holder will be moved into the chuck and will be threaded into the workpiece upon being rotated by the chuck.

2. A machine for driving elongated threaded fasteners into workpieces, said machine comprising a support, means on said support for storing a supply of fasteners and for delivering the fasteners one at a time to a loading station, a power-rotated chuck mounted on said support and adapted to grip a fastener and to rotate the fastener about its own axis, the improvement in said machine comprising, a holder mounted on said support to move laterally between a first position in which the holder is located in said loading station and a second position in which the holder is alined laterally with said chuck, means for moving said holder between said first and second positions, said holder receiving a fastener in said loading station when said holder is in said first position and moving the fastener laterally as the holder is moved to said second position, and means on said support adjacent the second position of said holder for supporting a workpiece for movement toward said chuck whereby the workpiece may be so moved when said holder is in said second position and will push the fastener endwise from the holder and into the chuck to enable the fastener to be threaded into the workpiece when the fastener is rotated by the chuck.

3. A machine as defined in claim 2 further comprising a shelf located in said loading station for catching and supporting each fastener delivered to the loading station prior to such fastener being received by said holder, means movable with said holder for pulling said shelf from beneath the fastener on the shelf as said holder moves into said first position whereby the bolt drops onto the holder, and means responsive to movement of said holder out of said first position for shifting said shelf into position to catch the next fastener delivered into said loading station.

4. A machine as defined in either of claims 2 or 3 in which said means for moving said holder between said first and second positions comprises a reversible actuator, means movably mounting said actuator to enable said holder to move toward said chuck when said holder is in said second position and as the fastener on the holder is pushed toward said chuck by the workpiece, and means operable when the holder has been moved a predetermined distance toward the chuck to cause the actuator to shift the holder from said second position to said first position.

5. A machine as defined in any of claims 2 or 3 in which said holder comprises an L-shaped member having a generally horizontal leg and having an upright leg with at least one of said legs being a permanent magnet.

6. A machine as defined in claim 5 in which said upright leg is magnetic and in which said horizontal leg is non-magnetic.

7. A machine as defined in claim 3 further including a pair of laterally spaced and generally upright walls located on said support on opposite sides of said loading station to confine each fastener delivered to the loading station, one of said walls being mounted to pivot to an open position and being pivoted to said open position by said holder when the holder is moved out of its first position.

8. A machine as defined in claim 7 further including means biasing said one wall to a closed position, and shelf retaining said one wall in its open position when said holder is in its second position and releasing said one wall for pivoting to its closed position when said holder is moved into its first position and said shelf is pulled from beneath the fastener on the shelf.

9. A machine as defined in claim 2 in which said delivering means comprise a downwardly inclined track for delivering the fasteners endwise to said loading station, a gate at the lower end of said track and movable between a closed position holding the endmost fastener in the track and an open position releasing such fastener for movement into said loading station, said gate being moved to said open position when said holder is moved out of said first position and being moved to said closed position when said holder is returned to said first position.

10. A machine as defined in claim 9 further including a track section movable with said gate and movable into alinement with the lower end of said track when said gate is moved to its open position whereby said track section guides the endmost fastener in said track into said loading station.

11. A machine as defined in either of claims 9 or 10 further including an escapement associated with said track and holding the endmost fastener in said track in a position spaced upstream from said gate when said gate is in said open position, said escapement being moved to an inactive position when said gate is moved to said closed position and being operable, when in said inactive position, to free the endmost fastener for movement down said track and into engagement with said gate.

12. A machine as defined in claim 11 in which said escapement comprises a plate overlying said track and having a depending member adapted to engage and hold successive fasteners moving down said track, said plate being mounted on said track to pivot upwardly to said inactive position with said member being lifted out of engagement with a fastener on said track when said plate is so pivoted, and means carried by said gate for pivoting said plate to said inactive position when said gate is moved to said closed position.

13. A machine as defined in either of claims 9 or 10 further comprising a shelf located in said loading station for catching and supporting each fastener delivered to the loading station prior to such fastener being received by said holder, means movable with said holder for pulling said shelf from beneath the fastener on the shelf as said holder moves into said first position whereby the bolt drops onto the holder, and means responsive to movement of said holder out of said first position for shifting said shelf into position to catch the next fastener delivered into said loading station.

14. A machine as defined in claim 13 in which said gate is connected to move with said shelf.

15. A machine as defined in any of claims 2, 3, 7, 8, 9 or 10 in which said means for supporting said workpiece are mounted on said support to move toward and away from said chuck, and springs baising said workpiece supporting means to move away from said chuck.

16. A machine for driving elongated threaded fasteners into workpieces, said machine comprising a support, means on said support for storing a supply of said fasteners and for delivering the fasteners one at a time to a loading station, a power-rotated chuck mounted on said support and adapted to grip a fastener and to rotate the fastener about its own axis, the improvement in said machine comprising, a shelf located in said loading station for catching and supporting each fastener delivered to the loading station, a holder mounted on said support to move laterally between a first position in which the holder is located beneath said shelf and a second position in which the holder is alined laterally with said chuck, means for moving said holder between its positions, means for pulling said shelf from beneath the fastener in said loading station as said holder moves into said first position whereby the fastener in said loading station drops off of said shelf and falls onto said holder, and means adjacent the second position of the holder for supporting a workpiece for movement toward said chuck whereby the workpiece may be so moved when said holder is in said second position and will push the fastener from the holder and into the chuck to enable the fastener to be threaded into the workpiece when the fastener is rotated by the chuck.

17. A machine for driving elongated threaded fasteners into workpieces, said machine comprising a support, a hopper on said support for storing a supply of fasteners, a track extending downwardly and forwardly from said hopper for receiving fasteners from the hopper and for supporting the fasteners in end-to-end relationship in a row, a power-rotated chuck mounted on said support and adapted to grip a fastener and to rotate the fastener about its own axis, the improvement in said machine comprising, a gate located adjacent the lower end of the track and mounted for lateral movement between a closed position holding the lowermost fastener in the track and an open position permitting such fastener to move down the track and past the gate, an escapement associated with said track upstream of said gate and mounted to move between inactive and active positions, said escapement releasing the second lowermost fastener in said track when the escapement is in said inactive position and engaging the following fastener and preventing the same from moving down said track when the escapement is in said active position, a shelf positioned beneath the lower end of said track and mounted for movement between an active position in which the shelf catches the fastener which moves past the gate and an inactive position in which the shelf drops such fastener, a holder mounted for lateral movement between first and second positions, said holder being located to catch the fastener dropped from said shelf when said holder is in said first position and, when moved to said second position, shifting said fastener laterally and into alinement with said chuck, means for moving said holder out of said first position and toward said second position and, at about the same time, moving said gate to its open position, moving said escapement to its active position and moving said shelf to its active position, means for moving said holder back into said first position and, at about the same time, moving said gate to said closed position, moving said escapement to its inactive position and moving said shelf to its inactive position, and means on said support adjacent the second position of said holder for supporting a workpiece for movement toward said chuck whereby the workpiece may be so moved when said holder is in said second position and will push the fastener on the holder endwise therefrom and into said chuck to enable the fastener to be threaded into the workpiece when the fastener is rotated by the chuck.

* * * * *